(12) United States Patent
Brown et al.

(10) Patent No.: US 11,375,553 B2
(45) Date of Patent: Jun. 28, 2022

(54) WIRELESS COMMUNICATION DEVICES, SYSTEMS AND METHODS FOR ESTABLISHING LATENCY-CRITICAL SERVICES

(71) Applicant: ORANGE, Issy-les-Moulineaux (FR)

(72) Inventors: Patrick Brown, Chatillon (FR); Salah Eddine El Ayoubi, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 17/046,934

(22) PCT Filed: Apr. 8, 2019

(86) PCT No.: PCT/FR2019/050818
§ 371 (c)(1),
(2) Date: Oct. 12, 2020

(87) PCT Pub. No.: WO2019/197766
PCT Pub. Date: Oct. 17, 2019

(65) Prior Publication Data
US 2021/0051735 A1 Feb. 18, 2021

(30) Foreign Application Priority Data

Apr. 13, 2018 (FR) ...................................... 1853253

(51) Int. Cl.
*H04W 74/08* (2009.01)
(52) U.S. Cl.
CPC ... *H04W 74/0841* (2013.01); *H04W 74/0808* (2013.01)

(58) Field of Classification Search
CPC ......... H04W 74/0808; H04W 74/0841; H04W 74/00; H04W 74/02; H04W 74/04;
(Continued)

(56) References Cited

U.S. PATENT DOCUMENTS 6,836,469 B1 * 12/2004 Wu ................... H04W 74/0866
370/230
8,369,306 B2 * 2/2013 Jung ................. H04W 74/0833
370/348

(Continued)

OTHER PUBLICATIONS

English translation of the Written Opinion of the International Searching Authority dated Jun. 13, 2019 for corresponding International Application No. PCT/FR2019/050818, filed Apr. 8, 2019.
(Continued)

*Primary Examiner* — Ahmed Elallam
(74) *Attorney, Agent, or Firm* — David D. Brush; Westman, Champlin & Koehler, P.A.

(57) ABSTRACT

Wireless communication devices, systems, and methods for establishing latency-critical services. When a mobile station attempts to transmit a packet on a contention-based multiple-access radio channel without a prior reservation of channel resources, the mobile station notifies the base station of its attempt to randomly access the channel. The notification is performed on dedicated channel resources. Upon receipt of the notification of a mobile station's access attempt, the base station can know that a mobile station is the origin of the colliding packets, and can therefore correctly manage the retransmission of packets not received.

15 Claims, 4 Drawing Sheets

(58) Field of Classification Search
CPC ............... H04W 74/008; H04W 74/08; H04W 74/0825; H04W 74/0833; H04W 74/0858; H04W 74/0866; H04W 74/0875
See application file for complete search history.

(56) References Cited

U.S. PATENT DOCUMENTS

| | | | | |
|---|---|---|---|---|
| 8,705,352 | B2* | 4/2014 | Chiu | ................. H04W 74/0833 |
| | | | | 370/230 |
| 9,232,363 | B2* | 1/2016 | Zakrzewski | ............ H04W 4/08 |
| 10,448,425 | B2* | 10/2019 | Au | ........................ H04W 74/02 |
| 11,071,149 | B2* | 7/2021 | Niu | ................... H04W 72/0406 |
| 11,109,416 | B2* | 8/2021 | Kim | ...................... H04W 74/02 |
| 2010/0272066 | A1 | 10/2010 | Wang et al. | |
| 2018/0042053 | A1 | 2/2018 | Martin | |
| 2019/0090263 | A1* | 3/2019 | Luo | ................... H04W 72/1236 |

OTHER PUBLICATIONS

International Search Report dated May 31, 2019 for corresponding International Application No. PCT/FR2019/050818, filed Apr. 8, 2019.

Written Opinion of the International Searching Authority dated May 31, 2019 for corresponding International Application No. PCT/FR2019/050818, filed Apr. 8, 2019.

Asustek et al., "Details of Prioritized Random Access for NR", vol. RAN WG2, No. Vancouver, Canada; 20180122-20180126, Jan. 12, 2018 (Jan. 12, 2018), 3GPP Draft; R2-1801430 Details of Prioritized Random Access_V6, 3rd Generation Partnership Project (3GPP), Mobile Competence Centre; 650, Route Des Lucioles; F-06921 Sophia0Antipolis Cedex; France, Retrieved from the Internet: http://www.3gpp.org/ftp/tsg%5Fran/WG2%5FRL2/TSGR2%5FAHs/2018%5F01%5FNR/Docs/ retrieved Jan. 12, 2018, XP051386839.

\* cited by examiner

WIRELESS COMMUNICATION DEVICES, SYSTEMS AND METHODS FOR ESTABLISHING LATENCY-CRITICAL SERVICES

CROSS-REFERENCE TO RELATED APPLICATIONS

This Application is a Section 371 National Stage Application of International Application No. PCT/FR2019/050818, filed Apr. 8, 2019, which is incorporated by reference in its entirety and published as WO 2019/197766 A1 on Oct. 17, 2019, not in English.

TECHNICAL FIELD

The present invention relates to the field of random access to the resources of a contention-based multiple access radio channel without prior reservation of resources. More specifically, it relates to wireless communication devices, systems, and methods for the establishment of latency-critical services.

PRIOR ART

The IMT-2020 standard defines the structure of the fifth generation of mobile networks. This standard is intended to be centered around several major uses including latency-critical services such as ultra-reliable low-latency communications (URLLC). Latency-critical services include all applications requiring extremely high responsiveness as well as a very strong guarantee of packet transmission. These requirements are primarily found in transportation (for example autonomous vehicles, drones), in medicine (for example remote surgery via medical robots), and generally in the fields of industry digitization.

In practice, a latency of only 1 ms may be required for latency-critical services. For comparison, the latency in a fourth generation mobile network is about 50 to 100 ms. As a reminder, latency corresponds to the delay that can be attributed to the cellular network itself between two sources.

It is envisaged that such latency-critical services established between a base station and several mobile stations can be implemented via a contention-based multiple access radio channel without prior reservation of the channel's resources. However, when several packets are sent randomly on such a channel, there is a high probability that collisions will occur. In response to these collisions, the base station may need to instruct the mobile stations concerned to retransmit the packets that were not correctly received. However, the base station may not know which mobile stations were the origin of the colliding packets, and therefore cannot correctly manage the retransmission of the packets not received.

It is therefore appropriate to propose a solution making it possible to identify the mobile station or stations concerned by the non-reception of their packets at a contention-based multiple access radio channel without prior reservation of the channel's resources. And for this to occur while respecting the latency constraints of latency-critical services.

SUMMARY OF THE INVENTION

The present invention therefore aims to overcome the abovementioned disadvantages.

To do so, in a first aspect of the invention, a base station is proposed comprising a calculation unit, a transmission unit, and a reception unit. According to the invention, the calculation unit is provided for forming a first plurality of resources and a second plurality of resources, from the resources of an uplink of a contention-based multiple access channel without prior reservation of resources. The transmission unit is provided for transmitting a unique transmission code to each of a plurality of mobile stations, each transmission code enabling the associated mobile station to indicate the transmission of an attempt to randomly access the first plurality of resources. The reception unit is provided for receiving, from at least one mobile station: at the first plurality of resources, a random access attempt in order to establish a latency-critical service; and at the second plurality of resources, at least one transmission code. The calculation unit is further provided for determining, from the received transmission code and from the plurality of received random access attempts, at least one mobile station for which the attempt to randomly access the first plurality of resources has failed, referred to as a failed mobile station. Finally, the transmission unit is further provided for transmitting non-reception acknowledgement information to the failed mobile station.

According to one implementation of the first aspect of the invention, the calculation unit is further provided for forming a third plurality of resources from the resources of the uplink of the contention-based multiple access channel without prior reservation of resources, and for reserving at least one resource of the third plurality of resources for each of one or more failed mobile stations. Finally, the reception unit is further provided for receiving, from at least one failed mobile station, at the third plurality of resources, at least one access attempt.

According to another implementation of the first aspect of the invention, the calculation unit is further provided for: grouping, according to a predetermined grouping criterion, a plurality of groups of failed mobile stations; associating the transmission of the non-reception acknowledgement information with each of the groups of the plurality of groups of failed mobile stations; and controlling the transmission unit to transmit the non-reception acknowledgement information associated with each of the groups of the plurality of groups of failed mobile stations, so that each transmission of a group starts one after the other according to a predetermined time interval.

In a second aspect of the invention, a mobile station is provided comprising a transmission unit and a reception unit. According to the invention, the reception unit is provided for receiving, from a base station, a unique transmission code indicative of the transmission of an attempt to randomly access a first plurality of resources of an uplink of a contention-based multiple access channel without prior reservation of resources. The transmission unit is provided for transmitting to the base station, in order to establish a latency-critical service: at least one random access attempt, at the first plurality of resources; and the transmission code received, at a second plurality of resources of the uplink of the contention-based multiple access channel without prior reservation of resources. Finally, the reception unit is further provided for receiving, from the base station, non-reception acknowledgment information indicative of the fact that the attempt to randomly access the first plurality of resources has failed.

According to one implementation of the second aspect of the invention, the reception unit is further provided for receiving, from the base station, a reservation of at least one resource of a third plurality of resources of the contention-based multiple access channel without prior reservation of resources. Finally, the transmission unit is further configured for transmitting, to the base station, at least one attempt to access the third plurality of resources.

The base station of the first aspect of the invention is configured for cooperating with a plurality of mobile stations of the second aspect of the invention.

In a third aspect of the invention, a wireless communication system is provided comprising at least one base station according to the first aspect of the invention and a plurality of mobile stations according to the second aspect of the invention.

In a fourth aspect of the invention, a method for wireless communication is provided, implemented in a base station according to the first aspect of the invention. According to the invention, the following steps are implemented:

forming a first plurality of resources and a second plurality of resources, from the resources of a contention-based multiple access channel without prior reservation of resources, transmitting a transmission code to each of a plurality of mobile stations, each transmission code enabling the associated mobile station to indicate the transmission of an attempt to randomly access the first plurality of resources, receiving, from at least one mobile station, at the first plurality of resources, a plurality of random access attempts in order to establish a latency-critical service, at the second plurality of resources, at least one transmission code, determining, from the transmission code received and from the plurality of random access attempts received, at least one mobile station for which the attempt to randomly access the first plurality of resources has failed, referred to as a failed mobile station, and transmitting non-reception acknowledgment information to the failed mobile station.

According to one implementation of the fourth aspect of the invention, the following steps are implemented:

forming a third plurality of resources from the resources of the contention-based multiple access channel without prior reservation of resources, reserving at least one resource of the third plurality of resources for each of one or more failed mobile stations, and receiving, from at least one failed mobile station, at the third plurality of resources, at least one access attempt.

According to another implementation of the fourth aspect of the invention, the following steps are implemented:

grouping, according to a predetermined grouping criterion, a plurality of groups of failed mobile stations, associating the transmission of the non-reception acknowledgement information with each of the groups of the plurality of groups of failed mobile stations, and configuring the transmission of the non-reception acknowledgement information associated with each of the groups of the plurality of groups of failed mobile stations, such that each transmission starts one after the other according to a predetermined time interval.

In a fifth aspect of the invention, a method for wireless communication is proposed, implemented in a mobile station according to the second aspect of the invention. According to the invention, the following steps are implemented:

receiving, from a base station, a transmission code indicative of the transmission of an attempt to randomly access a first plurality of resources of an uplink of a contention-based multiple access channel without prior reservation of resources, transmitting to the base station, in order to establish a latency-critical service:

at the first plurality of resources, at least one random access attempt, and at a second plurality of resources of the uplink of the contention-based multiple access channel without prior reservation of resources, the transmission code received, receiving, from the base station, non-reception acknowledgment information indicative of the fact that the attempt to randomly access the first plurality of resources has failed.

According to one implementation of the fifth aspect of the invention, the following steps are implemented:

receiving, from the base station, a reservation of at least one resource of a third plurality of resources of the uplink of the contention-based multiple access channel without prior reservation of resources, and transmitting, to the base station, at least one attempt to randomly access the third plurality of resources.

According to one implementation of the various aspects of the invention, the latency-critical service is an ultra-reliable low-latency service (URLLC).

Finally, the invention relates to processor-readable storage media implementing the fourth and fifth aspects of the invention.

One advantage of the invention is that, due to the cooperation between the base station of the first aspect and a plurality of mobile stations of the second aspect, it is possible to identify the mobile station or stations concerned by the non-reception of their packets at the channel, while respecting the latency constraints of latency-critical services.

BRIEF DESCRIPTION OF DRAWINGS

Other features and advantages of the invention will be better understood by reading the description which follows and by referring to the accompanying drawings, given by way of illustration and in no way limiting.

For clarity, the elements shown are not to scale relative to one other unless stated otherwise.

DESCRIPTION OF EMBODIMENTS

The general principle of the invention is based on the fact that when a mobile station attempts to transmit a packet on an uplink of a contention-based multiple access radio channel without prior reservation of the channel's resources, the invention proposes that the mobile station notifies the base station of its attempt to randomly access the channel. The notification is made over dedicated resources of the channel uplink. Upon receiving the notification of the access attempt from a mobile station, the base station can know that a mobile station is the source of colliding packets, and therefore can properly manage the retransmission of unreceived packets.

In the description, the invention will be described with reference to URLLC communications ("Ultra-Reliable Low-Latency Communication") as envisioned in the fifth generation of mobile networks. However, the invention is also more generally applicable to latency-critical services.

Figure 1:
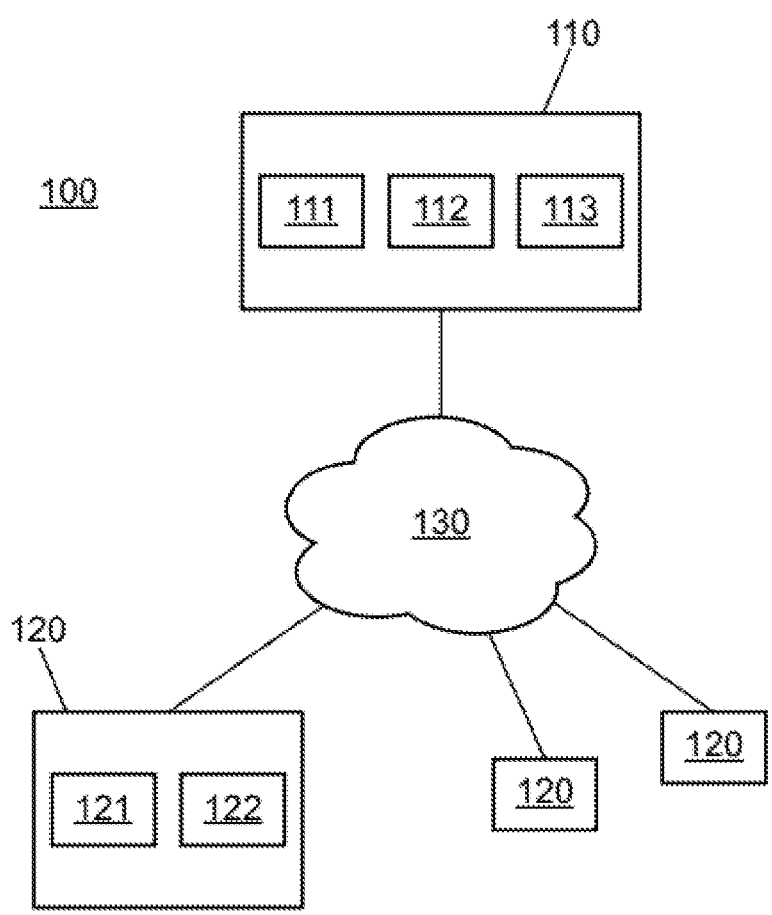
FIG. 1 represents a system according to the invention.

FIG. 1 illustrates a wireless communication system 100 according to the invention. The system 100 comprises a base station 110, several mobile stations 120, and a radio channel 130 with contention-based multiple access without prior reservation of resources. In one particular implementation, the system 100 comprises several base stations 110.

In the example of FIG. 1, the base station 110 comprises a calculation unit 111, a transmission unit 112, and a reception unit 113. In one example, the calculation unit 111 is a processor, the transmission unit 112 is a radio transmitter, and the reception unit 113 is a radio receiver.

The calculation unit 111 is configured for forming a first plurality of resources and a second plurality of resources, from the resources of an uplink of the channel 130. In one example, the methods for accessing the first plurality of resources and the second plurality of resources are different, such as CDMA ("Coded Division Multiple Access") or OFDMA ("Orthogonal Frequency Division Multiple Access"). In another example, the methods for accessing the first plurality of resources and the second plurality of resources are the same.

Figure 2A:
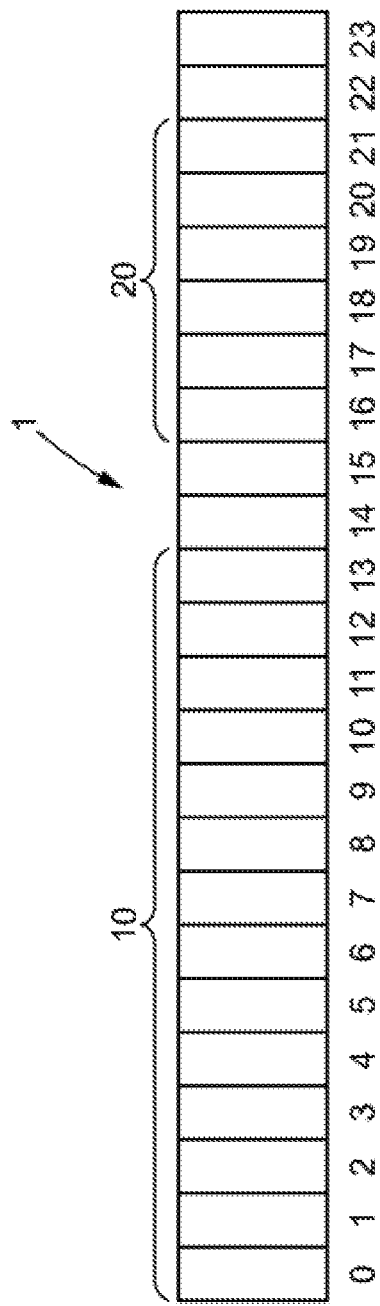
FIGS. 2A and 2B represent a first and a second implementation of the resources of the radio channel of FIG. 1, as arranged by the calculation unit of FIG. 1.

FIG. 2A illustrates a first implementation of the resources 1 of the channel 130 as arranged by the calculation unit 111 so as to form the first plurality of resources 10 and the second plurality of resources 20. In the example of FIG. 2A, the calculation unit 111 uses only a portion of the resources 1 of the channel 130. Indeed, resources 14-15 and 22-23 are not used by the calculation unit 111 for the formation of the first plurality of resources 10 and the second plurality of resources 20. Furthermore, the first plurality of resources 10 and the second plurality of resources 20 are not contiguous. However, it is also conceivable that the first plurality of resources 10 and the second plurality of resources 20 are contiguous. In one example, the first plurality of resources 10 is larger than the second plurality of resources 20.

Figure 2B:
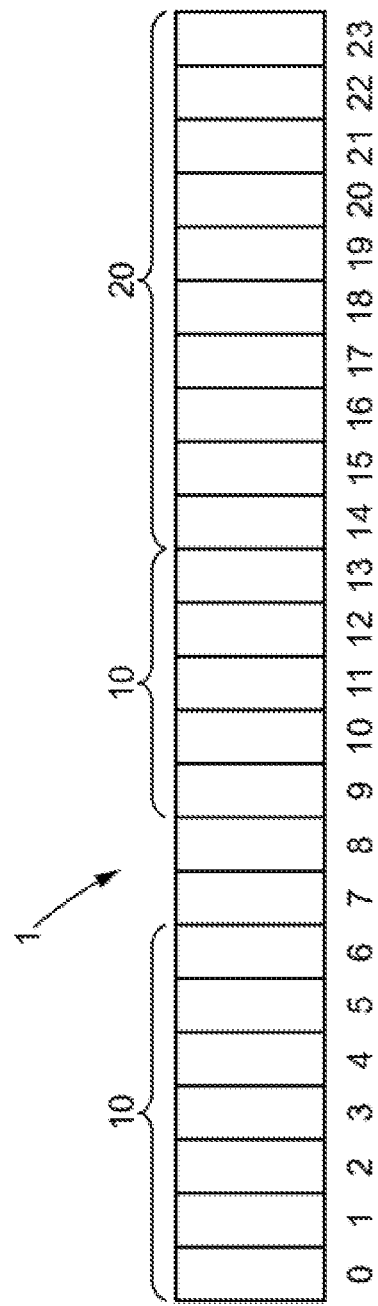

FIG. 2B illustrates a second implementation of the resources 1 of the channel 130 as arranged by the calculation unit 111 so as to form the first plurality of resources 10 and the second plurality of resources 20. In the example of FIG. 2B, the calculation unit 111 uses two non-contiguous portions of resources 1 to form the first plurality of resources 10. In one example, it is conceivable to use more than two non-contiguous portions of resources 1 to form the first plurality of resources 10 and/or the second plurality of resources 20. Furthermore, resources 7-8 are not used by the calculation unit 111 for the formation of the first plurality of resources 10 and the second plurality resources 20. In one example, the first plurality of resources 10 is larger than the second plurality of resources 20.

Returning to FIG. 1, the transmission unit 112 is configured for transmitting a unique transmission code to each of the mobile stations 120. Each transmission code is indicative of the transmission of an attempt to randomly access the first plurality of resources 10, by the associated mobile station. Furthermore, when several transmission codes are simultaneously received at a node of the system 100, each transmission code can be identified while creating little or no interference with other transmission codes. In one example, it is possible to use orthogonal or quasi-orthogonal codes (for example, codes based on Zadoff-Chu sequences or codes based on Gold sequences). The base station 110 can thus uniquely identify a mobile station 120 which is attempting to transmit a message to it, due to its transmission code. The transmission code may also comprise information indicative of the quality of service class of the latency-critical service requested by a mobile station 120. For example, if a mobile station 120 is configured for supporting two quality of service classes, this mobile station 120 may be associated with two transmission codes, each transmission code corresponding to a quality of service class of a latency-critical service.

In FIG. 1, the reception unit 113 is configured for receiving, from at least one mobile station 120, at the first plurality of resources 10, at least one random access attempt in order to establish a latency-critical service.

The reception unit 113 is configured for receiving, from at least one mobile station 120, at the second plurality of resources 20, at least one transmission code.

The calculation unit 111 is further configured for determining, from a transmission code received by the reception unit 113 and from the plurality of random access attempts received, at least one mobile station 120 for which the attempt to randomly access the first plurality of resources 10 has failed. Such a mobile station 120 will be identified hereinafter as a failed mobile station 120.

Indeed, access to the second plurality of resources 20 is not contention-based, such that it is guaranteed that the base station 110 will be able to distinguish each of the mobile stations which attempts to have access to the first plurality of resources 10. Furthermore, the base station 110 can determine the mobile stations for which the attempt to access the first plurality of resources 10 was successful, when decoding the attempts to access the first plurality of resources 10. Indeed, the attempt to access a mobile station 120 comprises address information enabling the mobile station 120 to be uniquely identified. Such a mobile station 120 will be identified hereinafter as a successful mobile station 120. Thus, by comparing the list of successful mobile stations with the list of transmission codes received by the reception unit 113, the base station 110 can identify the failed mobile stations 120. In other words, the failed mobile stations 120 correspond to the mobile stations 120 for which the transmission code has been received by the reception unit 113 and for which the base station 110 has not succeeded in decoding the associated random access attempt or attempts. In one example, the base station 110 considers that it has not succeeded in decoding the random access attempt or attempts, after a first predetermined waiting period. For example, the first waiting period comprises the time for receiving and processing one or more random access attempts over one or more predetermined time intervals.

Finally, returning to FIG. 1, the transmission unit 112 is further configured for transmitting non-reception acknowledgment information to one or more failed mobile stations 120. In one particular implementation, the base station 110 transmits reception acknowledgment information to one or more successful mobile stations 120. In one example, the transmission unit 112 sends out in unicast, broadcast, or multicast mode, the non-reception acknowledgment information and/or the reception acknowledgment information.

As indicated above, the base station 110 is configured for cooperating with a plurality of mobile stations 120.

In the example of FIG. 1, each mobile station 120 comprises a transmission unit 121 and a reception unit 122. In one example, the transmission unit 121 is a radio transmitter and the reception unit 122 is a radio receiver.

The reception unit 122 is configured for receiving, from the base station 110, a unique transmission code. As indicated above, each transmission code is indicative of the transmission of an attempt, by the mobile station 120, to randomly access the first plurality of resources 10 of the channel 130. In one example, the reception unit 122 receives a transmission code during a communication initialization phase between the mobile station 120 and the base station 110. During this initialization phase, the reception unit 122 may also receive from the base station 110, or from the system 100, information regarding the first plurality of resources 10 and the second plurality of resources 20. For example, this information may include the location of the resources which are to be used by the mobile station 120 to transmit messages. This could have the effect of limiting the number of collisions. In one particular implementation, the initialization phase may be implemented in a control plane of the system 100. As a reminder, the control plane of a system comprises all the control messages which are exchanged between the system entities.

Returning to FIG. 1, in order to establish a latency-critical service, the transmission unit 121 is configured for transmitting to the base station 110, at the first plurality of resources 20, at least one random access attempt. In one example, the mobile station 120 transmits a predetermined plurality of random access attempts. In one implementation, the access attempt of a mobile station 120 comprises address information which makes it possible to uniquely identify the mobile station 120. In another particular implementation, the access attempt may be implemented in a user plane of the system 100. As a reminder, the user plane of a system comprises all the user data which are exchanged over the interfaces of the system.

The transmission unit 121 is further configured for transmitting, to the base station 110, at the second plurality of resources 20 of the uplink of the channel 130, the transmission code received from the base station 110.

In one implementation, the transmission unit 121 simultaneously transmits the random access attempt and the transmission code received from the base station 110. In another implementation, the transmission unit 121 first transmits the transmission code received from the base station 110, and then transmits the random access attempt after a predetermined period of time.

Finally, the reception unit 122 is further configured for receiving, from the base station 110, non-reception acknowledgment information indicative of the fact that the attempt to randomly access the first plurality of resources 10 has failed. In one implementation, the reception unit 122 does not receive any non-reception acknowledgement information from the base station 110 because the base station 110 only sends reception acknowledgments. Indeed, in this implementation, the reception unit 122 considers that it has received non-reception acknowledgment information if it has not received a reception acknowledgment from the base station 110, after a second predetermined waiting period following the transmission of the attempt to randomly access the first plurality of resources 10.

Due to the cooperation between the base station 110 and a plurality of mobile stations 120, it is possible to identify the mobile station or stations 120 concerned by the non-reception of their packets at the channel 130, and to do so while respecting the latency constraints of latency-critical services. Indeed, in the invention, the transmission of packets is carried out on the resources of the channel 130 for which access is contention-based without prior reservation. It is conceivable that such a channel 130 will make it possible to achieve the latency objectives for latency-critical services.

Returning to FIG. 1, in one particular implementation of the base station 110, the calculation unit 111 is further configured for forming a third plurality of resources from the resources of the channel 130. For example, the third plurality of resources may comprise the unused resources 14-15 and 22-23 of FIG. 2A or the unused resources 7-8 of FIG. 2B. In addition, the calculation unit 111 is further configured for reserving at least one resource of the third plurality of resources for each among one or more of the failed mobile stations 120. In one example, the calculation unit 111 inserts the reservation of resources of the third plurality of resources in the non-reception acknowledgment information. Finally, the reception unit 113 is further configured for receiving, from at least one failed mobile station 120, at the third plurality of resources, at least one access attempt.

With such an implementation, the base station 110 guarantees that one or more failed mobile stations 120 will be able to retransmit their access attempt via at least one dedicated resource of the channel 130.

In FIG. 1, in one particular implementation of the mobile station 120, the reception unit 122 is further configured for receiving, from the base station 110, a reservation of at least one resource of a third plurality of resources of the channel 130. In one example, the mobile station 120 receives the reservation of at least one resource of a third plurality of resources in the non-reception acknowledgement information. In addition, the transmission unit 121 is further configured for transmitting, to the base station 110, at least one attempt to access the third plurality of resources.

With such an implementation, a failed mobile station 120 is guaranteed to be able to retransmit its access attempt via at least one dedicated resource of the channel 130.

Returning to FIG. 1, in one particular implementation of the base station 110, the calculation unit 111 is further configured for grouping, according to a predetermined grouping criterion, a plurality of groups of failed mobile stations 120. In one example, the predetermined grouping criterion corresponds to a temporal proximity of the time of reception of the transmission code by the reception unit 113. Thus, in this example, the calculation unit 111 groups the failed mobile stations 120 for which the transmission code was received at approximately the same time by the reception unit 113. In another example, the predetermined grouping criterion corresponds to a predetermined number of failed mobile stations 120 per group. In another example, the predetermined grouping criterion corresponds to a quality of service class of the latency-critical service. However, the grouping criteria mentioned above and other grouping criteria can be envisaged, alone or in combination, without the need for substantial modifications to the invention. In addition, the calculation unit 111 is further configured for associating the transmission of the non-reception acknowledgement information with each of the groups of the plurality of groups of failed mobile stations 120. Finally, the calculation unit 111 is further configured for controlling the transmission unit to transmit the non-reception acknowledgement information associated with each of the groups of the plurality of groups of failed mobile stations, such that each transmission of a group starts one after the other according to a predetermined time interval.

With such an implementation, the base station 110 can schedule the retransmission of attempts to access the resources of the channel 130 in order to avoid any congestion, by spreading out the retransmissions of the failed mobile stations 120.

Figure 3:
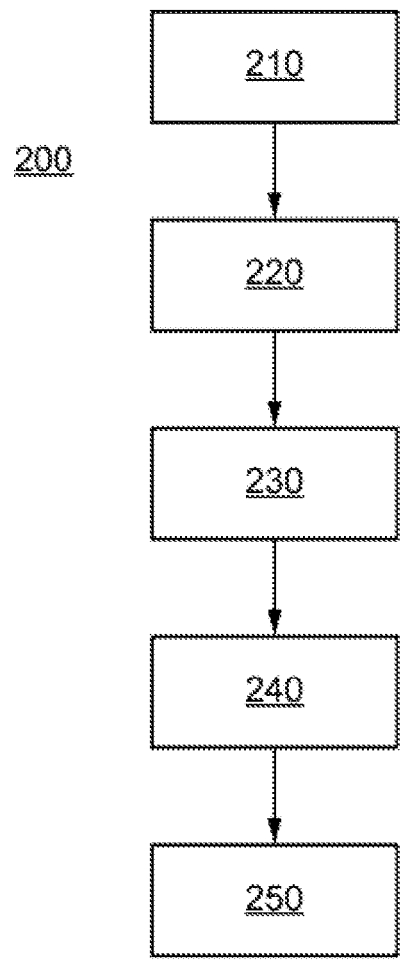
FIG. 3 represents a flowchart of a method implemented in the base station of FIG. 1.

FIG. 3 illustrates a wireless communication method 200, implemented in the base station 110.

The method 200 firstly consists of forming, in step 210, the first plurality of resources 10 and the second plurality of resources 20, from the resources of the channel 130, as indicated above.

Then, in step 220, a unique transmission code is transmitted to each of the mobile stations 120, as indicated above. Each transmission code is indicative of the transmission of an attempt to randomly access the first plurality of resources 10, by the associated mobile station 120.

Furthermore, in step 230, there is received, from at least one mobile station 120, at the first plurality of resources 10, a plurality of random access attempts in order to establish a latency-critical service, as indicated above. In addition, from at least one mobile station 120, at the second plurality of resources 20, at least one transmission code is received, as indicated above.

Subsequently, in step 240, it is determined, from the transmission code received and from the plurality of random access attempts received, at least one mobile station 120 for which the attempt to randomly access the first plurality of resources 10 has failed, referred to as the failed mobile station 120, as indicated above.

Finally, in step 250, non-reception of acknowledgment information is transmitted to the failed mobile station 120, as indicated above.

In one exemplary implementation of the method 200, a third plurality of resources is formed from the resources of the channel 130. Then, at least one resource of the third plurality of resources is reserved for each of one or more failed mobile stations. Finally, from at least one failed mobile station 120, at the third plurality of resources, at least one access attempt is received.

In one particular implementation of the method 200, a plurality of groups of failed mobile stations 120 are grouped according to a predetermined grouping criterion. Then, the transmission of the non-reception acknowledgement information is associated with each of the groups of the plurality of groups of failed mobile stations 120. Finally, the transmission of the non-reception acknowledgement information associated with each of the groups of the plurality of groups of failed mobile stations 120 is configured so that each transmission starts one after the other according to a predetermined time interval.

Figure 4:
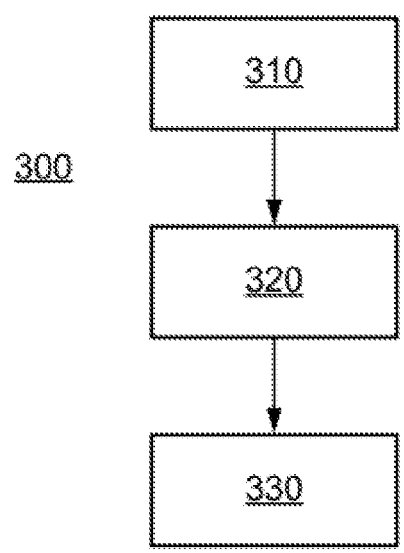
FIG. 4 represents a flowchart of a method implemented in the mobile station of FIG. 1.

FIG. 4 illustrates a wireless communication method 300, implemented in each mobile station 120.

The method 300 firstly consists of receiving, from a base station 110, in step 310, a unique transmission code indicative of the transmission of an attempt to randomly access the first plurality of resources 10 of the channel 130, as indicated above.

Then, in step 320, in order to establish a latency-critical service, at least one random access attempt is transmitted to the base station 110, at the first plurality of resources 10, as indicated above. In addition, in order to establish a latency-critical service, the received transmission code is transmitted to the base station 110, at a second plurality of resources 20 of the channel 130, as indicated above.

Finally, in step 330, non-reception acknowledgement information is received from the base station 110, indicative of the fact that the attempt to randomly access the first plurality of resources 10 has failed, as indicated above.

In one exemplary implementation of the method 300, a reservation of at least one resource of a third plurality of resources of the channel 130 is received from the base station 110. Finally, at least one attempt to access the third plurality of resources is transmitted to the base station 110.

The present invention has been described and illustrated in the present detailed description and in the figures. However, the present invention is not limited to the embodiments presented. Other variants and embodiments can thus be deduced and implemented by a person skilled in the art upon reading the present description and the appended figures.

For example, methods 200 and 300 may be implemented using hardware and/or software elements. In particular, it may be implemented as a computer program comprising instructions for its execution. The computer program may be stored on a processor-readable recording medium. The medium may be electronic, magnetic, optical, or electromagnetic.

In particular, the invention may be implemented by devices comprising a processor and a memory. The processor may be a generic processor, a specific processor, an application-specific integrated circuit (ASIC), or a field-programmable gate array (FPGA).

The device may use one or more dedicated electronic circuits or a general purpose circuit. The technique of the invention may be implemented on a reprogrammable computing machine (a processor or a microcontroller for example) executing a program comprising a sequence of instructions or on a dedicated computing machine (for example, a set of logic gates such as an FPGA or an ASIC, or any other hardware module).

According to one embodiment, the device comprises at least one computer-readable storage medium (RAM, ROM, EEPROM, flash memory, or other memory technology, CD-ROM, DVD, or other optical disc medium, magnetic cassette, magnetic tape, magnetic storage disk, or other storage device, or other computer-readable non-transitory storage medium) coded with a computer program (in other words multiple executable instructions) which, when executed by one or more processors, performs the functions of the embodiments of the invention, described above.

The invention claimed is:

1. A base station, comprising:
a processor; and
a non-transitory computer-readable medium comprising instructions stored thereon which when executed by the processor configure the base station to:
   form a first plurality of resources and a second plurality of resources, said first plurality of resources being resources of an uplink of a channel with contention-based multiple access without prior reservation of resources,
   transmit a unique transmission code to each of a plurality of mobile stations, each transmission code enabling the associated mobile station to indicate a transmission of an attempt to randomly access the first plurality of resources,
   receive, from at least one mobile station:
      at the first plurality of resources, at least one random access attempt in order to establish a latency-critical service, and
      at the second plurality of resources, at least one transmission code,
   determine, from the received transmission code and from the plurality of received random access attempts, at least one mobile station for which the attempt to randomly access the first plurality of resources has failed, referred to as a failed mobile station, and
   transmit non-reception acknowledgment information to the failed mobile station.

2. The base station according to the previous claim 1, wherein the instructions further configure the base station to:
   form a third plurality of resources from the resources of the uplink of the contention-based multiple access channel, and reserve at least one resource of the third plurality of resources for each of one or more failed mobile stations; and receive, from at least one failed mobile station, at the third plurality of resources, at least one access attempt.

3. The base station according to claim 1, wherein the instructions further configure the base station to:

group, according to a predetermined grouping criterion, a plurality of groups of failed mobile stations, associate the transmission of the non-reception acknowledgement information with each of the groups of the plurality of groups of failed mobile stations, and control a transmission unit to transmit the non-reception acknowledgement information associated with each of the groups of the plurality of groups of failed mobile stations, so that each transmission of a group starts one after the other according to a predetermined time interval.

4. A mobile station, comprising:

a processor; and a non-transitory computer-readable medium comprising instructions stored thereon which when executed by the processor configure the mobile station to:

receive, from a base station, a unique transmission code indicative of a transmission of an attempt to randomly access a first plurality of resources of an uplink of a channel with contention-based multiple access without prior reservation of resources, transmit to the base station, in order to establish a latency-critical service:

at the first plurality of resources, at least one random access attempt, and at a second plurality of resources, the transmission code received, and receive, from the base station, non-reception acknowledgment information indicative of the fact that the attempt to randomly access the first plurality of resources has failed.

5. The mobile station according to claim 4, wherein the instructions further configure the mobile station to:

receive, from the base station, a reservation of at least one resource of a third plurality of resources of the uplink of the contention-based multiple access channel, and transmit, to the base station, at least one attempt to access the third plurality of resources.

6. A wireless communication system comprising:

at least one base station; and a plurality of mobile stations, each of the at least one base station comprising:

a first processor; and a first non-transitory computer-readable medium comprising instructions stored thereon which when executed by the first processor configure the base station to:

form a first plurality of resources and a second plurality of resources, said first plurality of resources being resources of an uplink of a channel with contention-based multiple access without prior reservation of resources, transmit a unique transmission code to each of the plurality of mobile stations, each transmission code enabling the associated mobile station to indicate a transmission of an attempt to randomly access the first plurality of resources, receive, from at least one mobile station, at the first plurality of resources, at least one random access attempt in order to establish a latency-critical service, and at the second plurality of resources, at least one transmission code, determine, from the received transmission code and from the plurality of received random access attempts, at least one mobile station for which the attempt to randomly access the first plurality of resources has failed, referred to as a failed mobile station, and transmit non-reception acknowledgment information to the failed mobile station, each of the plurality of mobile stations comprising:

a second processor; and a second non-transitory computer-readable medium comprising instructions stored thereon which when executed by the second processor configure the mobile station to:

receive, from the base station, the unique transmission code indicative of the transmission of an attempt to randomly access the first plurality of resources of the uplink of the channel with contention-based multiple access without prior reservation of resources, transmit to the base station, in order to establish a latency-critical service:

at the first plurality of resources, at least one random access attempt, and at the second plurality of resources, the transmission code received, receive, from the base station, the non-reception acknowledgment information indicative of the fact that the attempt to randomly access the first plurality of resources has failed.

7. A method for wireless communication, implemented in a base station, comprising:

forming a first plurality of resources and a second plurality of resources, said first plurality of resources being resources of an uplink of a contention-based multiple access channel without prior reservation of resources, transmitting a transmission code to each of a plurality of mobile stations, each transmission code enabling the associated mobile station to indicate a transmission of an attempt to randomly access the first plurality of resources, receiving, from at least one mobile station:

at the first plurality of resources, a plurality of random access attempts in order to establish a latency-critical service, and at the second plurality of resources, at least one transmission code, determining, from the transmission code received and from the plurality of random access attempts received, at least one mobile station for which the attempt to randomly access the first plurality of resources has failed, referred to as a failed mobile station, and transmitting non-reception acknowledgment information to the failed mobile station.

8. The method according to claim 7, comprising:

forming a third plurality of resources from the resources of the uplink of the contention-based multiple access channel, reserving at least one resource of the third plurality of resources for each of one or more failed mobile stations, and receiving, from at least one failed mobile station, at the third plurality of resources, at least one access attempt.

9. The method according to claim 7, further comprising:

grouping, according to a predetermined grouping criterion, a plurality of groups of failed mobile stations, associating the transmission of the non-reception acknowledgement information with each of the groups of the plurality of groups of failed mobile stations, and configuring the transmission of the non-reception acknowledgement information associated with each of the groups of the plurality of groups of failed mobile stations, such that each transmission starts one after the other according to a predetermined time interval.

10. The method according to the previous claim 7, wherein the latency-critical service is an ultra-reliable low-latency service, URLLC.

11. A method for wireless communication, implemented in a mobile station, comprising:

receiving, from a base station, a transmission code indicative of a transmission of an attempt to randomly access a first plurality of resources of an uplink of a contention-based multiple access channel without prior reservation of resources, transmitting to the base station, in order to establish a latency-critical service:
at the first plurality of resources, at least one random access attempt,
at a second plurality of resources, the transmission code received, and receiving, from the base station, non-reception acknowledgment information indicative of the fact that the attempt to randomly access the first plurality of resources has failed.

12. The method according to claim 11, comprising:

receiving, from the base station, a reservation of at least one resource of a third plurality of resources of the contention-based multiple access channel, and transmitting, to the base station, at least one attempt to randomly access the third plurality of resources.

13. The method according to claim 11, wherein the latency-critical service is an ultra-reliable low-latency service, URLLC.

14. A non-transitory computer readable medium having stored thereon instructions of a computer program for implementing a method for wireless communication when said instructions are executed by a processor of a base station, wherein the instructions configure the base station to:

form a first plurality of resources and a second plurality of resources, said first plurality of resources being resources of an uplink of a contention-based multiple access channel without prior reservation of resources, transmit a transmission code to each of a plurality of mobile stations, each transmission code enabling the associated mobile station to indicate a transmission of an attempt to randomly access the first plurality of resources, receive, from at least one mobile station:
at the first plurality of resources, a plurality of random access attempts in order to establish a latency-critical service, and
at the second plurality of resources, at least one transmission code, determining, from the transmission code received and from the plurality of random access attempts received, at least one mobile station for which the attempt to randomly access the first plurality of resources has failed, referred to as a failed mobile station, and transmit non-reception acknowledgment information to the failed mobile station.

15. A non-transitory computer readable medium having stored thereon instructions of a computer program for implementing a method for wireless communication when said instructions are executed by a processor of a mobile station, wherein the instructions configure the mobile station to:

receive, from a base station, a transmission code indicative of a transmission of an attempt to randomly access a first plurality of resources of an uplink of a contention-based multiple access channel without prior reservation of resources, transmit to the base station, in order to establish a latency-critical service:
at the first plurality of resources, at least one random access attempt,
at a second plurality of resources, the transmission code received, and receive, from the base station, non-reception acknowledgment information indicative of the fact that the attempt to randomly access the first plurality of resources has failed.

* * * * *